(12) United States Patent
Wang et al.

(10) Patent No.: US 8,451,367 B2
(45) Date of Patent: May 28, 2013

(54) BEARING DEVICE AND IMAGING SYSTEM USING THE SAME

(75) Inventors: Zhen-Hua Wang, Shenzhen (CN); Pei-Chong Tang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 408 days.

(21) Appl. No.: 12/875,138

(22) Filed: Sep. 3, 2010

(65) Prior Publication Data

US 2011/0211085 A1    Sep. 1, 2011

(30) Foreign Application Priority Data

Mar. 1, 2010    (CN) .......................... 2010 1 0115382

(51) Int. Cl.
*G02B 13/16*    (2006.01)
*H04N 5/225*    (2006.01)

(52) U.S. Cl.
USPC ........................................................ 348/335

(58) Field of Classification Search
USPC ......................................................... 348/335
See application file for complete search history.

(56) References Cited

U.S. PATENT DOCUMENTS

2002/0140838 A1* 10/2002 Yoshikawa .................... 348/345
2002/0140905 A1* 10/2002 Ouchi et al. ..................... 353/31

FOREIGN PATENT DOCUMENTS

| CN | 1824588 A | 8/2006 |
|---|---|---|
| CN | 101644789 A | 2/2010 |

* cited by examiner

*Primary Examiner* — Anthony J Daniels
(74) *Attorney, Agent, or Firm* — Altis Law Group, Inc.

(57) ABSTRACT

An imaging system uses optical modules to capture images of a subject. The optical modules are fixed on a bearing plate of the imaging system by a fastening element of the imaging system. The fastening element is removable and fixed on the support plate. Each of the optical modules has an optical surface. The fastening element has a bevel attached to all the optical surfaces of the optical modules so that all the optical surfaces are coplanar.

19 Claims, 5 Drawing Sheets

BEARING DEVICE AND IMAGING SYSTEM USING THE SAME

BACKGROUND

1. Technical Field

The present disclosure relates to a bearing device for optical modules and an imaging system using the same.

2. Description of Related Art

Frequently used image capture systems can employ interlaced optical modules, such as plane mirrors and prisms, to redirect light rays for optimized image quality. However, such systems are subject to misalignment due to external factors such as impact and jarring, for example. Such misalignments can negatively affect image quality.

BRIEF DESCRIPTION OF THE DRAWINGS

Aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding sections throughout the figures.

DETAILED DESCRIPTION

Figure 1:
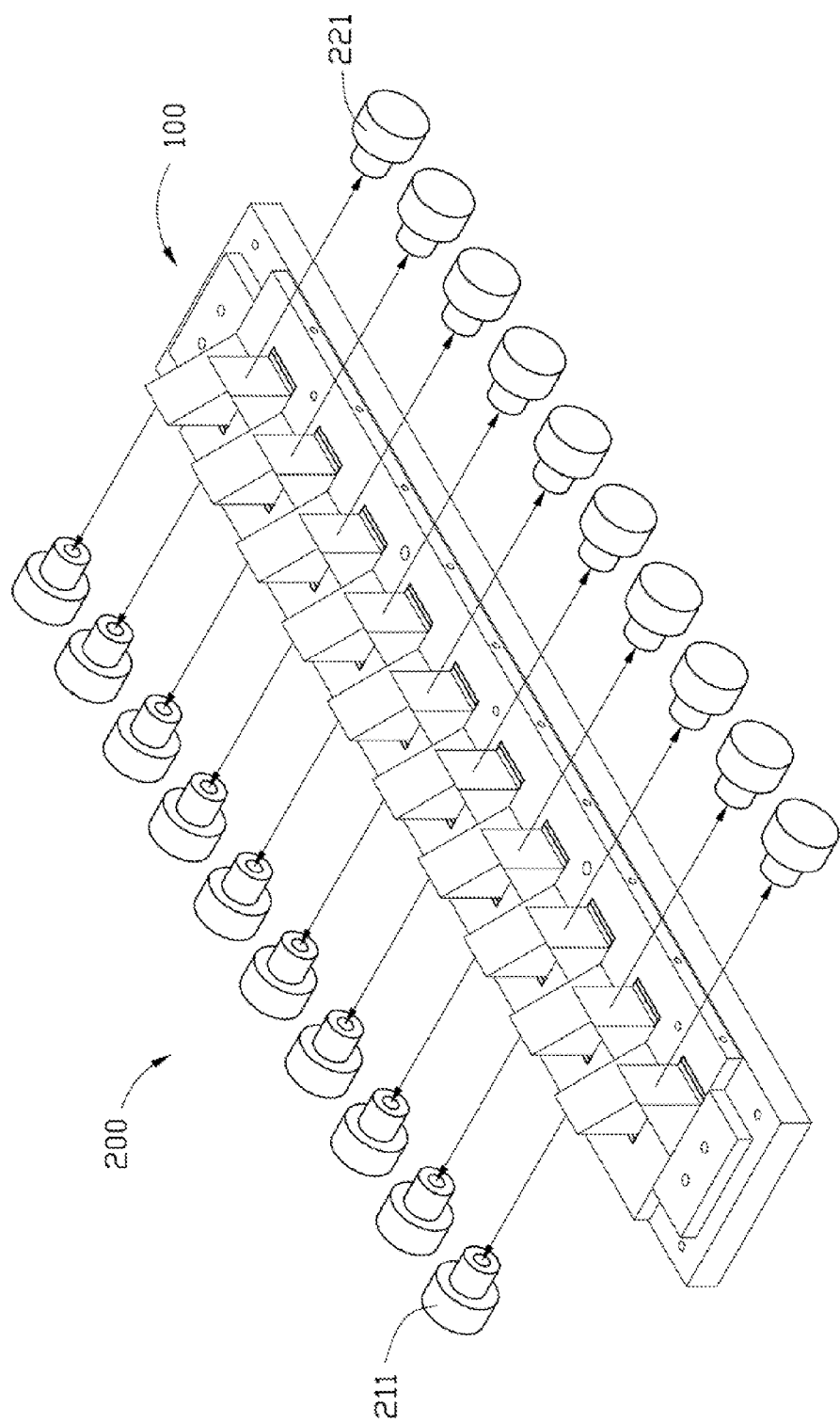
FIG. 1 is a perspective view of a first embodiment of an imaging system.

FIG. 1 shows a first embodiment of an imaging system 200 comprising a bearing device 100, a plurality of first camera modules 211, a plurality of second camera modules 221, and a plurality of optical modules 10. The plurality of first camera modules 211 and the plurality of second camera modules 221 are arranged facing a first direction, thereby constituting a camera array.

The plurality of optical modules 10 are located along an optical path between the subject and the plurality of first camera modules 211 or between the subject and the plurality of second camera modules 221. Each of the plurality of optical modules 10 comprises an effective optical surface to redirect light reflected from the subject to the plurality of first camera modules 211 and the plurality of second camera modules 221. The plurality of optical modules 10 comprise a plurality of first optical sub-modules 101 and a plurality of second optical sub-modules 104. In the embodiment, the plurality of optical modules 10 are a plurality of right-angled prisms, each of the prisms having a hypotenuse face acting as the optical surfaces. The plurality of optical surfaces of the plurality of first optical sub-modules 101 are on a first plane. The plurality of second optical sub-modules 104 are on a second plane. The plurality of first optical sub-modules 101 and the plurality of second optical sub-modules 104 are interlaced, with the first plane perpendicular to the second plane, such that a center of the optical surfaces of the plurality of first optical sub-modules 101 is collinear with a center of the optical surfaces of the plurality of second optical sub-modules 104. In the embodiment, the plurality of first optical sub-modules 101 and the plurality of second optical sub-modules 104 are glass or other materials equally applicable.

Figure 2:
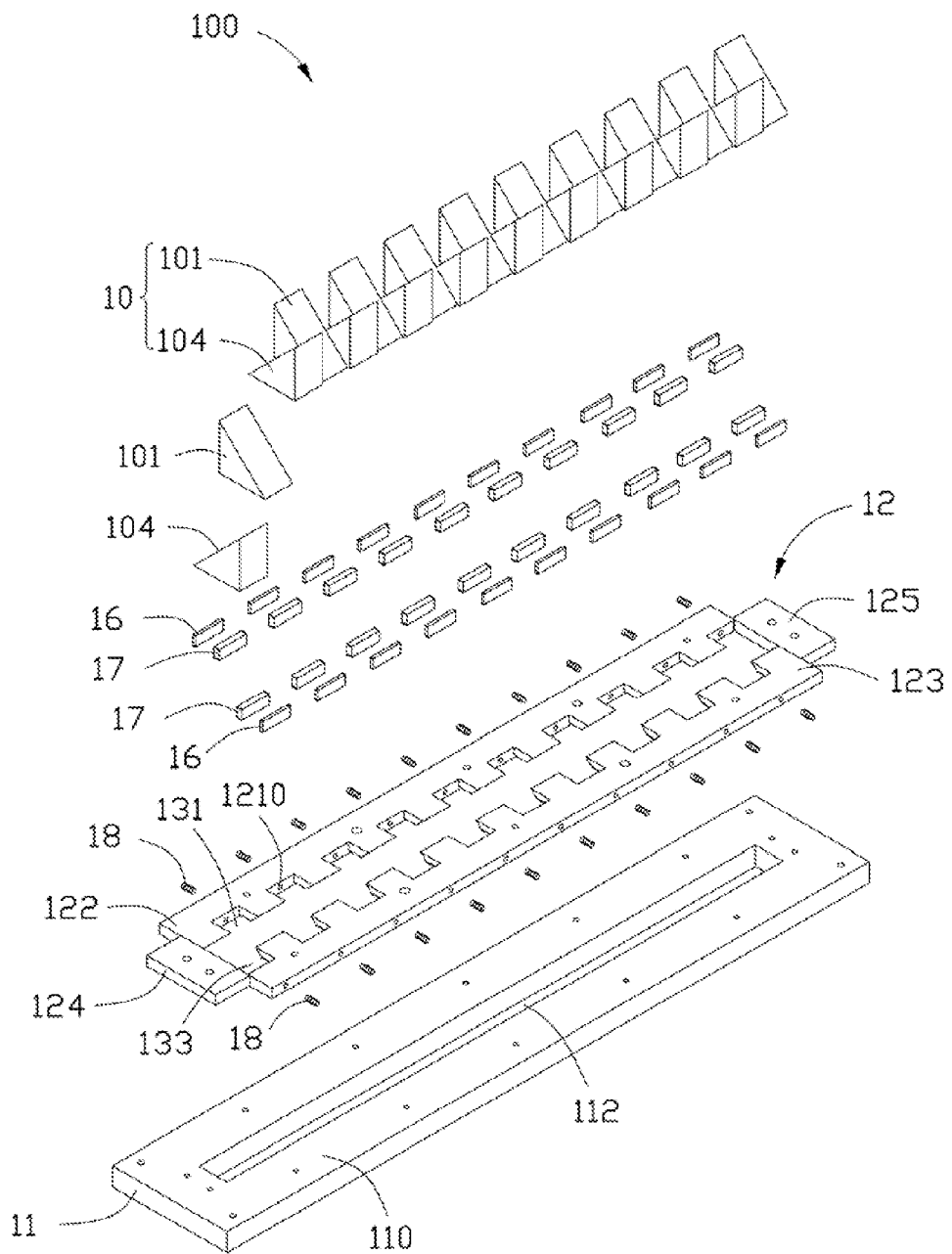
FIG. 2 shows a bearing device as disclosed, employed in an imaging system, such as, for example, that of FIG. 1, shown from a first perspective.

FIG. 2 shows a bearing device 100 as disclosed, employed in an imaging system, such as, for example, that of FIG. 1, shown from a first perspective. The bearing device 100 comprises a support plate 11, a support surface 110, and a fastening element 12. An optical hole 112 defined on the support surface 110 passes through to a lower surface of the support plate 11. The support surface 110 supports the plurality of first optical sub-modules 101 and the plurality of second optical sub-modules 104. Each of the plurality of first optical sub-modules 101 and second optical sub-modules 104 is attached to the support surface 110 with one of a plurality of right-angled surfaces such that an angle between each of the plurality of optical surfaces of the plurality of first optical sub-modules 101 and second optical sub-modules 104, and the support surface 110 is 45°. The plurality of first optical sub-modules 101 and second optical sub-modules 104 span the optical hole 112. The light reflected from the subject passes through the optical hole 112 into the plurality of optical modules 10, and, completely reflected thereby, out the right-angled surfaces of the plurality of first optical sub-modules 101 and second optical sub-modules 104, reaching the plurality of first camera modules 211 and second camera modules 221.

The fastening element 12 fixes the plurality of first optical sub-modules 101 and second optical sub-modules 104 on the support plate 11. The fastening element 12 comprises a first fastening piece 122, a second fastening element 123, a third fastening element 124, a fourth fastening element 125, a plurality of anchoring blocks 16, a plurality of elastic pads 17, and a plurality of positioning pieces 18.

The first fastening piece 122 and second fastening element 123 are fixed opposite to each other on the support surface 110, at different sides of the optical hole 12. The first fastening piece 122 and second fastening element 123 cooperatively fix the plurality of first optical sub-modules 101 and second optical sub-modules 104 on the support plate 11 such that the optical surfaces of the plurality of first optical sub-modules 101 are on the first plane, and the optical surfaces of the plurality of second optical sub-modules 104 are on the second plane. In the embodiment, the first fastening piece 122 and second fastening element 123 can be fixed to the support plate 11 by fasteners or adhesive.

The first fastening piece 122 comprises a first bevel on a surface proximal to the second fastening element 123, and a plurality of first receiving grooves 131. The first bevel is parallel with the second plane so that the optical surfaces of the plurality of second optical sub-modules 104 can be attached thereto. The plurality of first receiving grooves 131 receive the plurality of first optical sub-modules 101 when the first bevel attaches to the optical surfaces of the plurality of second optical sub-modules 104. The second fastening piece 123 comprises a second bevel on a surface proximal to the first fastening element 122, and a plurality of second receiving grooves 133. The second bevel is parallel with the first plane so that the optical surfaces of the plurality of first optical sub-modules 101 can be attached thereto. The plurality of second receiving grooves 133 receive the plurality of second optical sub-modules 104 when the second bevel attaches the optical surfaces of the plurality of first optical sub-modules 101. The plurality of positioning pieces 18 penetrate a plurality of alignment holes 1210 located on a plurality of slots on the first bevel and the corresponding plurality of second receiving grooves 133, and a plurality of slots on the second bevel and the corresponding plurality of first receiving grooves 131. In the embodiment, the alignment holes 1210 are threaded and the positioning pieces 18 are threaded fasteners.

Figure 3:
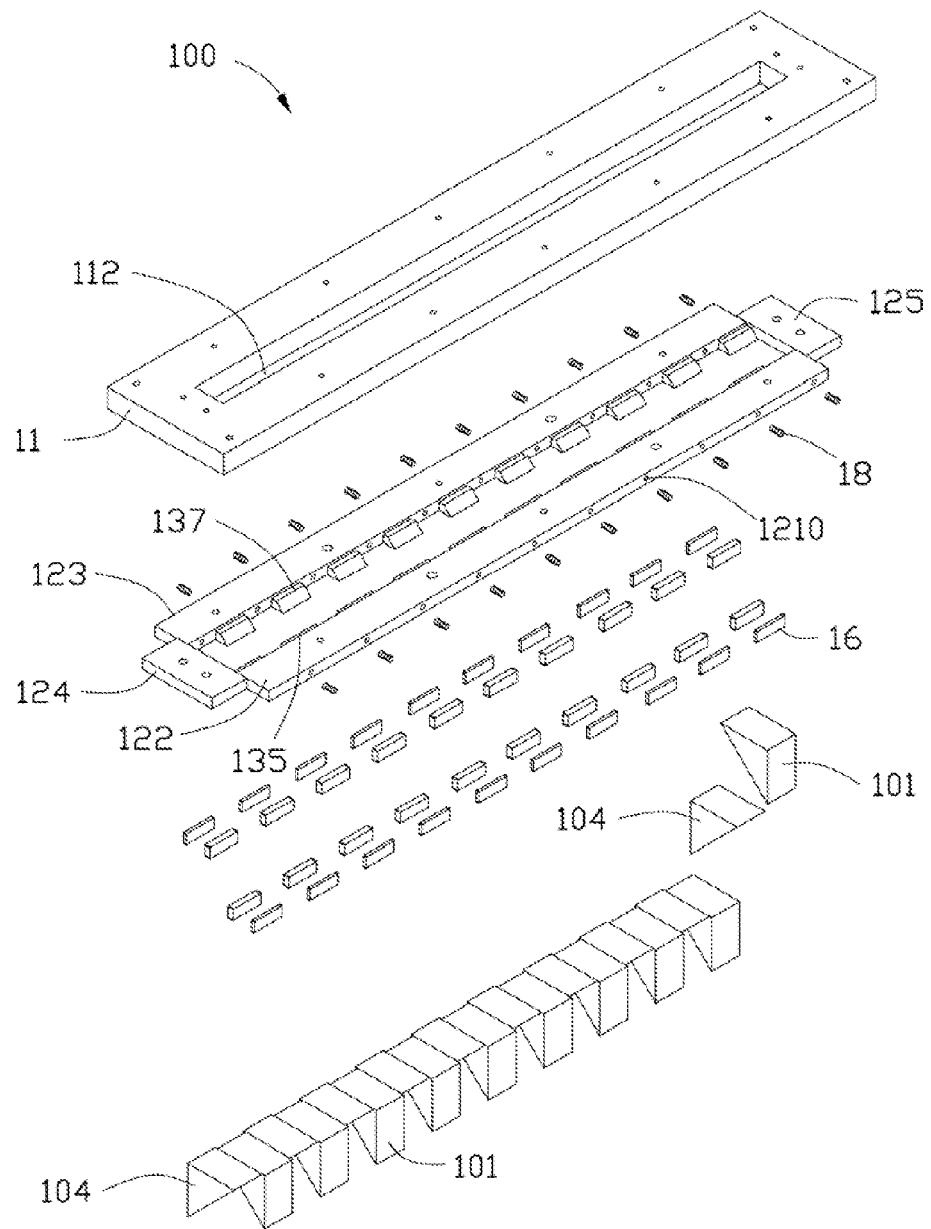
FIG. 3 shows the bearing device of FIG. 2 from a second perspective.
Figure 4:
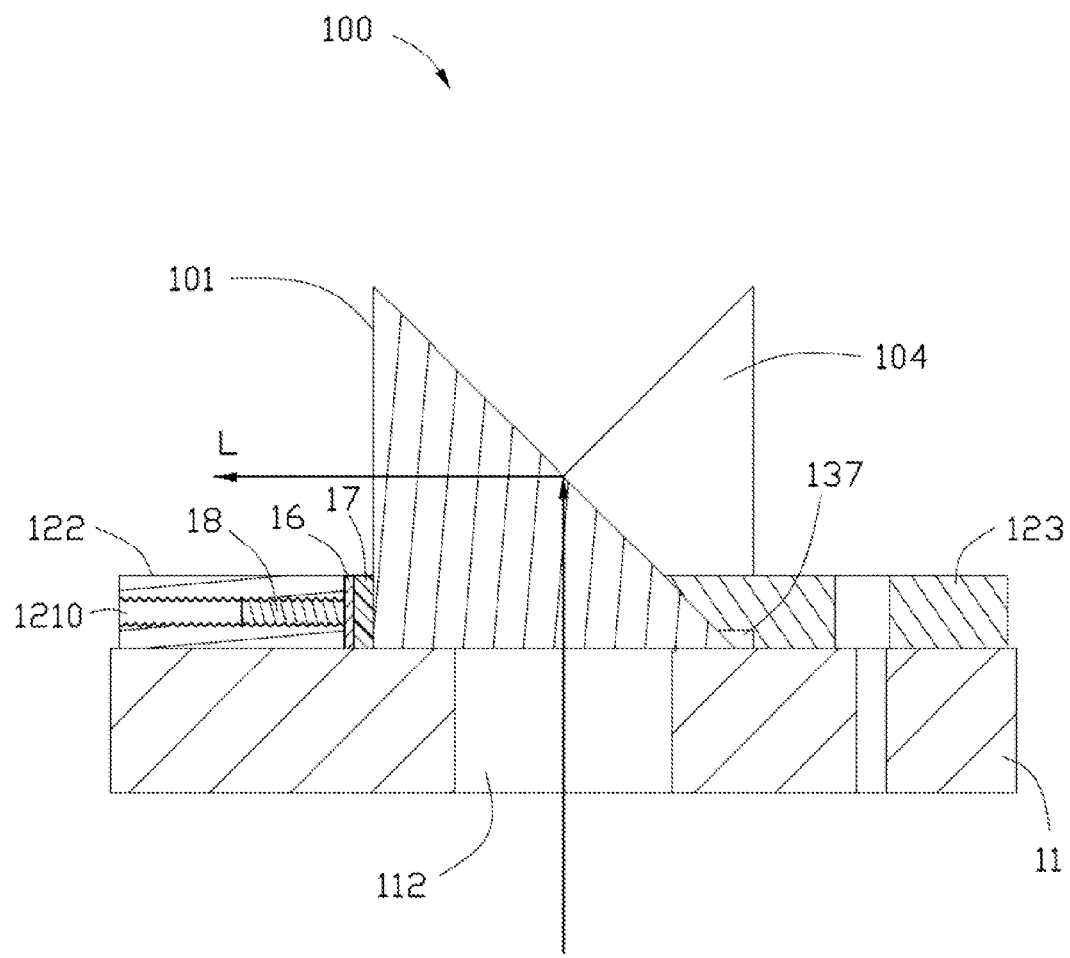
FIG. 4 is a partial cross section of FIG. 1.

FIG. 3 shows the bearing device of FIG. 2 from a second perspective. The first fastening piece 122 further comprises a first fall-back groove 135 in communication with the plurality of first receiving grooves 131 to receive the bottom of the plurality of second optical sub-modules 104 proximal to the support plate 11, effectively increasing contact between the plurality of optical surfaces of the plurality of second optical sub-modules 104 and the first bevel. The second fastening piece 123 further comprises a second fall-back groove 137 in communication with the plurality of second receiving grooves 133 to receive the bottom of the plurality of first optical sub-modules 101 proximal to the support plate 11, effectively increasing contact between the plurality of optical surfaces of the plurality of first optical sub-modules 101 and the second bevel. In the embodiment, a first fall-back groove 135 and a second fall-back groove 137 are optional.

The anchoring blocks 16 and elastic pads 17 are located between each first receiving groove 131 and corresponding first optical sub-module 101, and between each second receiving groove 133 and second optical sub-module 104. Each positioning piece 18 is received in a corresponding alignment hole 1210 and contacts a corresponding anchoring block 16 and elastic pad 17, so as to fix the optical modules 10 between the first fastening piece 122 and the second fastening piece 123. The plurality of anchoring blocks 16 balance force from the plurality of positioning pieces 18. The plurality of elastic pads 17 buffer pressure from the plurality of anchoring blocks 16. The plurality of elastic pads 17 are softer than the plurality of optical modules 10, protecting the plurality of optical modules 10 from damage. It is understood that the plurality of anchoring blocks 16 and elastic pads 17 are optional.

The third fastening piece 124 and the fourth fastening piece 125 are fixed opposite to each other on the support surface 110, located at different sides of the optical hole 12. The third fastening piece 124 is located at one end of the first fastening piece 122 and second fastening piece 123, and the fourth fastening piece 125 at another end of the first fastening piece 122 and second fastening piece 123. The third fastening piece 124 and fourth fastening piece 125 fix the plurality of first optical sub-modules 101 and second optical sub-modules 104, in cooperation with the first fastening piece 122 and the second fastening piece 123. The third fastening piece 124 and the fourth fastening piece 125 are optional. The first fastening piece 122, the second fastening piece 123, the third fastening piece 124, and the fourth fastening piece 125 can further be integrally formed.

Assembly of the fastening element 12 and the plurality of optical modules 10, is as follows. The first fastening piece 122 is fixed on the support surface 110, and each of the plurality of anchoring blocks 16 and elastic pads 17 is respectively received in the corresponding plurality of first receiving grooves 131. Each of the interlaced plurality of first optical sub-modules 101 and second optical sub-modules 104 is mounted on the support surface 110, spanning the optical hole 112, received in the corresponding plurality of first receiving grooves 131. The first bevel is attached to the optical surfaces of the plurality of second optical sub-modules 104, and the second fastening piece 123 is fixed on the support surface 110. Each of the plurality of anchoring blocks 16 and elastic pads 17 is respectively received in the corresponding plurality of second receiving grooves 133, followed by each of the plurality of first optical sub-modules 101 and second optical sub-modules 104. The second bevel is attached to the optical surfaces of the plurality of first optical sub-modules 101. The plurality of positioning pieces pass through the corresponding plurality of alignment holes 1210 and contact the corresponding plurality of anchoring blocks 16. The third fastening piece 124 and the fourth fastening piece 125 are fastened on the support surface 110.

Reflected light L passes through the optical hole 112 into the interlaced plurality of first optical sub-modules 101 and second optical sub-modules 104, is fully reflected by the optical surfaces thereof, and passes into the plurality of first camera modules 211 and second camera modules 221.

Figure 5:
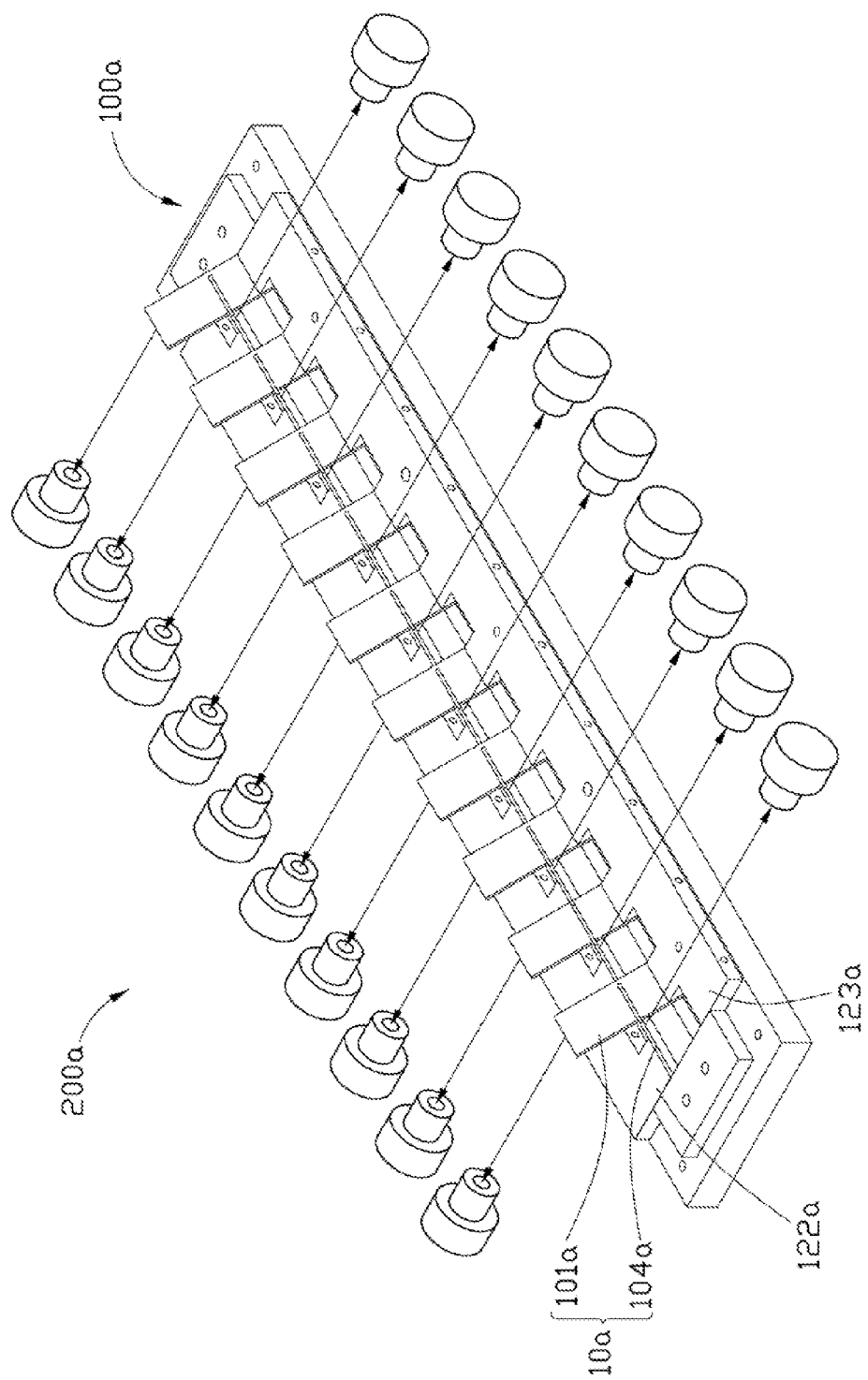
FIG. 5 is a perspective view of a second embodiment of the imaging system of FIG. 1.

It is understood that the plurality of optical modules 10 in the first embodiment of the present disclosure are not limited to right-angled prisms. FIG. 5 is a perspective view of a second embodiment of an imaging system 200a, differing from the first embodiment only in that the plurality of second optical sub-modules 104a comprise plane mirrors fixed on a bevel of a first fastening piece 122a of the bearing device 100a by adhesive, the plurality of first optical sub-modules 101a comprise plane mirrors fixed on a bevel of a second fastening piece 123a of the bearing device 100a by adhesive, and the bearing device 100a comprises no anchoring blocks 16, elastic pads 17, or positioning pieces 18.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent, indicated by the broad general meaning of the terms in which the appended claims are expressed.

What is claimed is:

1. A bearing device, comprising:
a support plate to support a plurality of optical modules; and
a fastening element to fasten the plurality of optical modules onto the support plate;
wherein each of the plurality of optical modules comprises an effective optical surface, and the fastening element comprises a first fastening piece and a second fastening piece which are fixed opposite to each other on the support plate; the first fastening piece comprises a plurality of bevels on a surface proximal to the second fastening piece, the second fastening piece comprises a plurality of receiving grooves on a surface proximal to the first fastening piece and opposite to the corresponding bevels; when the first and second fastening pieces cooperatively mount each optical module on the support plate, an end of each optical module opposite to the effective optical surface is received in each of the receiving groove, the effective optical surface of each optical module attaches to each bevel opposite to the corresponding receiving groove, such that the plurality of effective optical surfaces are coplanar.

2. The device as claimed in claim 1, comprising a hole defined in an upper surface of the support plate passing through to a lower surface of the support plate to transmit light to the plurality of optical surfaces.

3. The device as claimed in claim 1, wherein the plurality of optical modules comprises a plurality of first optical sub-modules in a row, whereby the optical surfaces of the plurality of first optical sub-modules are on a first plane, and a plurality of second optical sub-modules in a row, whereby the optical surfaces of the plurality of second optical sub-modules are on a second plane, wherein the plurality of first optical sub-modules and the plurality of second optical sub-modules are arranged alternatively, wherein the first plane is perpendicular to the second plane.

4. The device as claimed in claim 3, wherein the first fastening piece and the second fastening piece cooperatively hold the plurality of alternatively arranged first and second optical sub-modules, wherein the first and second fastening pieces comprise a first and second bevel respectively on a surface proximal to each other, and the first fastening piece comprises a plurality of first receiving grooves, the second fastening piece comprises a plurality of second receiving grooves, wherein when the plurality of first receiving grooves receives the plurality of first optical sub-modules, the second bevel attaches the plurality of optical surfaces of the plurality of first optical sub-modules, and when the plurality of second receiving grooves receives the plurality of second optical sub-modules, the first bevel attaches the plurality of optical surfaces of the plurality of second optical sub-modules.

5. The device as claimed in claim 4, wherein the fastening element further comprises a plurality of positioning pieces, each received in an alignment hole defined in each of the plurality of first and second receiving grooves.

6. The device as claimed in claim 5, wherein the alignment holes are threaded, and the positioning pieces are threaded fasteners.

7. The device as claimed in claim 4, wherein the first fastening piece further comprises a first fall-back groove in communication with the plurality of first receiving grooves to receive the bottom of all the plurality of second optical sub-modules proximal to the support plate, and the second fastening piece further comprises a second fall-back groove in communication with the plurality of second receiving grooves to receive the bottom of all the plurality of first optical sub-modules proximal to the support plate.

8. The device as claimed in claim 4, wherein the fastening element further comprises a plurality of anchoring blocks positioned between the plurality of first receiving grooves and the plurality of corresponding first optical sub-modules, and between the plurality of second receiving grooves and the plurality of corresponding second optical sub-modules, wherein each of the plurality of positioning pieces is received in the corresponding plurality of alignment holes and contacts the corresponding plurality of anchoring blocks.

9. The device as claimed in claim 8, wherein the fastening element further comprises a plurality of elastic pads positioned between the plurality of anchoring blocks and the first and second optical sub-modules, fixing the corresponding first or second optical sub-modules in cooperation with the corresponding plurality of anchoring blocks.

10. The device as claimed in claim 4, wherein the fastening element further comprises a third fastening piece and a fourth fastening piece fixed opposite to each other on the support plate, the third fastening piece at one end of the first and second fastening pieces and the fourth fastening piece at the other end of the first and second fastening pieces, the third and fourth fastening pieces fixing the plurality of first and second optical sub-modules in cooperation with the first and second fastening pieces.

11. The device as claimed in claim 1, wherein the plurality of optical modules comprise right-angled prisms, hypotenuse surfaces of which act as optical surfaces.

12. The device as claimed in claim 1, wherein the plurality of optical modules comprise plane mirrors.

13. An imaging system, comprising:
a plurality of image capture devices comprising a plurality of optical modules, each of which comprises an optical surface altering paths of light reflected from a subject; and
a bearing device comprising a support plate and a fastening element to support the plurality of optical modules, the fastening element comprising a first fastening piece and a second fastening piece which are fixed opposite to each other on the support plate; the first fastening piece comprises a plurality of bevels on a surface proximal to the second fastening piece, the second fastening piece comprises a plurality of receiving grooves on a surface proximal to the first fastening piece opposite to the corresponding bevels;
when the first and second fastening pieces cooperatively mount each optical module on the support plate, an end of each optical module opposite to the effective optical surface is received in each the receiving groove, the effective optical surface of each optical module attaches to each bevel opposite to the corresponding receiving groove, such that the plurality of optical surfaces is coplanar.

14. The imaging system as claimed in claim 13, wherein the plurality of optical modules comprises a plurality of first optical sub-modules in a row, whereby the optical surfaces of the plurality of first optical sub-modules are on a first plane, and a plurality of second optical sub-modules in a row, whereby the optical surfaces of the plurality of second optical sub-modules are on a second plane, wherein the plurality of first optical sub-modules and the plurality of second optical sub-modules are arranged alternately wherein the first plane is perpendicular to the second plane.

15. The imaging system claimed in claim 14, wherein the first fastening piece and the second fastening piece cooperatively hold the plurality of alternately arranged first and second optical sub-modules, wherein the first and second fastening pieces comprise a first and second bevel respectively on a surface proximal to each other, and the first fastening piece comprises a plurality of first receiving grooves, the second fastening piece comprises a plurality of second receiving grooves, wherein when the plurality of first receiving grooves receives the plurality of first optical sub-modules, the second bevel attaches the plurality of optical surfaces of the plurality of first optical sub-modules, and when the plurality of second receiving grooves receives the plurality of second optical sub-modules, the first bevel attaches the plurality of optical surfaces of the plurality of second optical sub-modules.

16. The imaging system as claimed in claim 15, wherein the first fastening piece further comprises a first fall-back groove in communication with the plurality of first receiving grooves to receive the bottom of all the plurality of second optical sub-modules proximal to the support plate, and the second fastening piece further comprises a second fall-back groove in communication with the plurality of second receiving grooves to receive the bottom of all the plurality of first optical sub-modules proximal to the support plate.

17. The imaging system as claimed in claim 16, wherein the fastening element further comprises a plurality of anchoring blocks positioned between the plurality of first receiving grooves and the plurality of corresponding first optical sub-modules, and between the plurality of second receiving grooves and the plurality of corresponding second optical sub-modules, wherein each of the plurality of positioning pieces is received in the corresponding plurality of alignment holes and contacts the corresponding plurality of anchoring blocks.

18. The imaging system as claimed in claim 17, wherein the fastening element further comprises a plurality of elastic pads positioned between the plurality of anchoring blocks and the first and second optical sub-modules, fixing the corresponding first or second optical sub-modules in cooperation with the corresponding plurality of anchoring blocks.

19. The imaging system as claimed in claim 15, wherein the fastening element further comprises a third fastening piece and a fourth fastening piece fixed opposite to each other on the support plate, the third fastening piece at one end of the first and second fastening pieces and the fourth fastening piece at the other end of the first and second fastening pieces, the third and fourth fastening pieces fixing the plurality of first and second optical sub-modules in cooperation with the first and second fastening pieces.

\* \* \* \* \*